(12) United States Patent
Batur et al.

(10) Patent No.: US 8,588,600 B2
(45) Date of Patent: Nov. 19, 2013

(54) STEREOSCOPIC AUTO-FOCUS BASED ON COORDINATED LENS POSITIONS

(75) Inventors: Aziz Umit Batur, Dallas, TX (US); Mark Noel Gamadia, Longmont, CO (US); Gregory Robert Hewes, Sachse, TX (US); Fred William Ware, Jr., Carrollton, TX (US); Wei Hong, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/191,357

(22) Filed: Jul. 26, 2011

(65) Prior Publication Data

US 2013/0028582 A1    Jan. 31, 2013

Related U.S. Application Data

(60) Provisional application No. 61/368,063, filed on Jul. 27, 2010.

(51) Int. Cl.
*G03B 3/00* (2006.01)

(52) U.S. Cl.
USPC .......................................................... 396/124

(58) Field of Classification Search
USPC .......................................................... 396/124
See application file for complete search history.

(56) References Cited

U.S. PATENT DOCUMENTS

| | | | | |
|---|---|---|---|---|
| 4,418,993 A | | 12/1983 | Lipton | |
| 5,142,357 A | | 8/1992 | Lipton et al. | |
| 5,832,325 A | * | 11/1998 | Ito et al. | 396/326 |
| 7,092,015 B1 | * | 8/2006 | Sogawa | 348/222.1 |
| 7,181,061 B2 | | 2/2007 | Kawano et al. | |
| 7,911,496 B2 | * | 3/2011 | Sawachi | 348/42 |
| 7,936,384 B2 | * | 5/2011 | Sawachi | 348/240.1 |
| 8,135,270 B2 | * | 3/2012 | Tanaka | 396/104 |
| 2001/0014221 A1 | * | 8/2001 | Tomita | 396/325 |
| 2002/0196423 A1 | * | 12/2002 | Shima | 356/3.14 |
| 2007/0025713 A1 | * | 2/2007 | Hosono | 396/72 |
| 2007/0296809 A1 | * | 12/2007 | Newbery | 348/42 |
| 2008/0024596 A1 | * | 1/2008 | Li et al. | 348/47 |
| 2010/0188558 A1 | | 7/2010 | Gamadia et al. | |
| 2011/0002680 A1 | | 1/2011 | Narasimha et al. | |
| 2011/0012998 A1 | * | 1/2011 | Pan | 348/47 |
| 2011/0018972 A1 | * | 1/2011 | Pan | 348/47 |
| 2011/0019989 A1 | | 1/2011 | Tanaka | |
| 2011/0109727 A1 | | 5/2011 | Matsuura | |

* cited by examiner

*Primary Examiner* — Rodney Fuller
(74) *Attorney, Agent, or Firm* — Mirna Abyad; W. James Brady; Frederick J. Telecky, Jr.

(57) ABSTRACT

Methods for automatic focus in a stereographic imaging device that includes two imaging sensor systems are provided. Focus searches are executed on both imaging sensor systems to determine optimal focused lens positions for each. The focus searches may be executed currently or sequentially, and may be at differing lens position granularities. Focal scores and spatial locations, i.e., the locations of focus regions, may be shared between the imaging sensor systems to coordinate the focus searches. Touchscreen coordinates may also be used to coordinate the focus searches.

18 Claims, 16 Drawing Sheets

STEREOSCOPIC AUTO-FOCUS BASED ON COORDINATED LENS POSITIONS

CROSS-REFERENCE TO RELATED APPLICATIONS

This application claims benefit of U.S. Provisional Patent Application Ser. No. 61/368,063, filed Jul. 27, 2010, which is incorporated by reference herein in its entirety.

BACKGROUND OF THE INVENTION

1. Field of the Invention

Embodiments of the present invention generally relate to methods for automatically focusing a stereoscopic imaging device.

2. Description of the Related Art

Automatic focus, also referred to as auto focus, is an important feature of consumer imaging devices such as for example, digital still cameras, web cameras, digital video cameras, cellular telephones, and the like. The purpose of auto focus is to rapidly bring an object of interest in a scene into focus by moving the lens to the correct position such that the subject in a scene is in focus. A typical auto focus approach is a passive approach which uses image analysis to extract a measure of sharpness from focus regions in an image. The in-focus position of the lens is found by locating the maximum of a sharpness function computed from images of a scene captured at different lens positions.

Consumer imaging devices are now coming available that provide stereoscopic imaging. Performing automatic focus in a stereoscopic imaging device is challenging. A stereoscopic imaging device has two or more lenses, each with a separate image sensor. Further, the lenses are arranged such that each has a field of view of a scene that is slightly shifted from the other lenses. Because of the slight shift in perspective, if each lens is focused independently, each lens could end up focusing on different objects in the scene, resulting in poor image quality. Accordingly, the focusing of the lenses needs to be coordinated in some way so that each lens focuses on the same object.

SUMMARY

Embodiments of the present invention relate to a method for automatically focusing a stereographic imaging device that includes performing a first focus search in a first imaging sensor system of the stereoscopic imaging device, determining a first focused lens position for the first imaging sensor system and a second focused lens position for a second imaging sensor system of the stereoscopic imaging device based on the first focus search, and moving a lens in the first imaging sensor system to the first focused lens position and a lens in the second imaging sensor system to the second focused lens position. The method may also include performing a second focus search on the second imaging sensor system. The second focus search may be based on focal information such as lens position and focus region from the first focus search or may be performed concurrently with the first focus search. The method may also include performing additional focus searches concurrently on the first and second imaging systems based on focal information from the first and second focus searches. The method may also include performing the focus searches based on the coordinates of a focus location on a touchscreen selected by a user.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
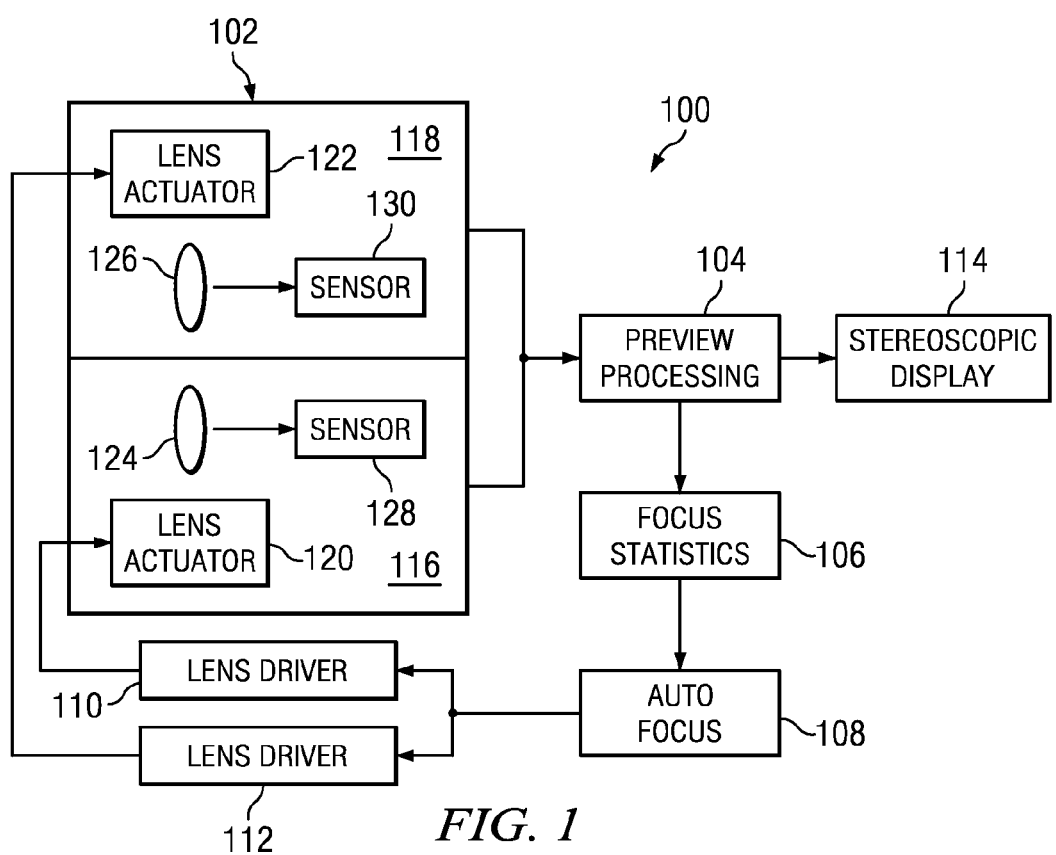
FIG. 1 shows a block diagram of a stereoscopic imaging device configured to perform automatic focusing.

Specific embodiments of the invention will now be described in detail with reference to the accompanying figures. Like elements in the various figures are denoted by like reference numerals for consistency.

Embodiments of the invention provide for automatic focus in stereoscopic imaging devices. In general, focal information is shared between imaging sensor systems of a stereoscopic imaging device such that each imaging sensor system will be automatically focused on the same object. In some embodiments, one imaging sensor system is initially focused on a spatial location and then another imaging sensor system is focused on the same spatial location. Such embodiments are relatively simple to implement as compared to other embodiments described herein but may be slower as focusing of one of the imaging sensor systems does not occur until the other is focused. In some embodiments, each imaging sensor system is initially focused separately. If both systems are focused on the same spatial location, the automatic focusing is complete. However, if each system is focused on a different spatial location, one of the systems is selected as the master and the other is focused on the same spatial location as the master. Such embodiments may achieve focus of the imaging sensor systems faster than the previous embodiments but are more complex to implement.

In some embodiments, rather than performing auto focus in real-time, each imaging sensor system is initially focused separately and the focal scores for each lens position in each imaging sensor system are stored in memory. The focal scores are then analyzed off line to determine focused lens positions for both imaging sensor systems. In this analysis, one imaging sensor system is selected as the master and the other imaging sensor system is focused based on the master focus results. Such embodiments may achieve focus of the imaging sensor systems faster than the previous embodiments but are more complex to implement.

In some embodiments, imaging sensor systems are focused concurrently by maximizing sharpness metric, i.e., a maximum focal score across a focal search range. A focal score is a summation of sharpness metrics from different regions in a frame. The focus search or focal sweep involves moving the lens in an imaging sensor system across multiple lens positions in order to evaluate the change in focus and sharpness on the exposed frame. After evaluating the focal scores across the entire focus sweep, the lens position that achieved the maximum focal score is selected. Sometimes a local maximum is chosen or excluded depending on the focus mode. Such embodiments may achieve focus of the imaging sensor systems with more complexity in order to reduce the number of lens positions analyzed.

In some embodiments, a focus search in one imaging sensor system is performed from the infinite lens position to a middle lens position and a simultaneous focus search is performed in another imaging sensor system from the near lens position to the middle lens position. Both imaging sensor systems are then focused around the lens position with the highest maximum focal score from the two searches. In some embodiments, the imaging sensor systems are independently focused around a focus point indicated by a touch on a touch screen.

FIG. 1 shows a simplified block diagram of stereoscopic imaging device 100 configured to perform automatic focusing of stereoscopic images. More specifically, the stereoscopic imaging device may be configured to perform a method for automatic focusing of stereoscopic images as described herein. The stereoscopic imaging device 100 includes a stereo imaging module 102, a preview processing component 104, a focus statistics component 106, an auto focus component 108, lens drivers 110, 112, and a stereoscopic display 114.

The stereo imaging module 102 includes two imaging sensor systems 116, 118 arranged to capture image signals of a scene from a left viewpoint and a right viewpoint. That is, one imaging sensor system 116 is arranged to capture an image signal from the left viewpoint, i.e., a left analog image signal, and the other imaging sensor system 118 is arranged to capture an image signal from the right view point, i.e., a right analog image signal. Each of the imaging sensor subsystems includes a lens assembly 126, 124, a lens actuator 120, 122, an aperture (not shown), and an imaging sensor 128, 130. The lens assemblies 126, 124 may be any suitable lens assembly. For example, a lens assembly may include a zoom lens and a focus lens. The lens actuators 120, 122 may be any suitable actuator technology that supports movement of the lens assembly 124, 126 to change the position of a focus lens between a far position, also referred to as infinity or infinite distance, and a closest position, also referred to as the macro position or closest distance. The imaging sensors 128, 130 may be any suitable imaging sensors such as, for example, a CMOS (Complementary Metal-Oxide Semiconductor) or CCD (Charge Coupled Device) imaging sensor. The stereo imaging device 102 also includes circuitry for controlling various aspects of the operation of the component, such as, for example, aperture opening amount, exposure time, etc. The stereo imaging module 102 further includes functionality to convert the left and right analog image signals to left and right digital image signals and to provide the left and right digital image signals to the preview processing component 104.

The preview processing component 104 receives the left and right digital image signals sequentially, divides the left and right digital signals into left and right frames, and processes each frame to enhance the scene in the frame. The image processing performed may include one or more image enhancement techniques such as, for example, black clamping, fault pixel correction, color filter array (CFA) interpolation, gamma correction, white balancing, color space conversion, edge enhancement, and detection of average scene brightness for automatic exposure adjustment. If automatic focus is enabled, e.g., by a half or full press of a shutter button in the stereoscopic imaging device 100, the left and right frames are sequentially provided to the focus statistics component 106. The processed left and right frames are also displayed as a stereoscopic image on the stereoscopic display 114.

The focus statistics component 106 computes sharpness metrics for the left and right frames. More specifically, the focus statistics component 106 applies an auto focus window, i.e., a focus search window, to a frame and computes a sharpness or focal score for each paxel in the auto focus window. A focus search window is an M×N region of a frame that may include all or a subset of frame. Further, a focus search window is evenly divided into m×n panes of pixel values referred to as paxels. As is explained in more detail herein, the size of the auto focus window and the number and size of paxels in the auto focus window are configurable. Any suitable technique for computing the focal score of a paxel may be used. The paxel focal scores for each frame are provided to the auto focus component 108.

The auto focus component 108 operates in accordance with an auto focus method as described herein in reference to FIGS. 2-15. In general, the auto focus component 108 determines a lens position for each imaging sensor system 116, 118 such that each of the sensor systems is focused on the same region in the scene. Further, in general, the auto focus component 108 uses the paxel focus scores for a frame to analyze the focus search window for a focus region with a highest focal score. A focus region may include one or more adjacent paxels. This highest focal score is the frame focus score. The auto focus component 106 may use any suitable technique for determining the focus region with the highest focal score.

Further, in general, the auto focus component 108 determines a focused lens position for an imaging sensor system as the lens position with the best frame focus score over a sequence of frames captured at sequentially increasing or decreasing lens positions. The auto focus component 108 includes functionality to determine the size and paxel configuration of an auto focus window to be applied by the focus statistics component 106 over the sequence of frames and to determine the range and granularity of lens positions to be used during focusing operations on each of the imaging sensor systems 116, 118. The auto focus component 108 may use any suitable technique for determining the best focus score. For example, the auto focus component 108 may use a center focus technique that computes a frame focus score as the combined paxel focus scores of a center region of paxels in the auto focus window and selects the lens position with the maximum frame focus score as the focused lens position. In another example, the auto focus component 108 may select the closest lens position with the highest frame focus score as the focused lens position. The functionality of the auto focus component 108 is explained in more detail in the method descriptions herein.

The lens drivers 110, 122 are operable to control the lens actuators 120, 122 to cause the lens assemblies 124, 126 to move to positions specified by the auto focus component 108. As will be apparent from the method descriptions herein, the auto focus component 108 communicates desired lens positions to the lens drivers 110, 122 at various points in the auto focus processing.

The stereoscopic display 114 is a display configured to present stereoscopic images to a user of the stereoscopic imaging device 100 in a manner that allows stereoscopic vision. The stereoscopic display 114 may be any suitable display device capable of displaying stereoscopic content. For example, the stereoscopic display 114 may be a 2D or 3D display device, e.g., a 2D or 3D liquid crystal display (LCD) device, for which the stereoscopic images are converted anaglyph images that require special glasses to view the 3D effect. In another example, the stereoscopic display 114 may be a display with optical components that enable viewing of the 3D effect without special glasses, such as, for example, a stereoscopic 3D LCD device or a stereoscopic 3D organic electroluminescent display device.

In some embodiments, the stereoscopic display 114 may have a touch panel overlay. The touch panel is a thin panel overlaying the display screen that can detect the presence and location of a touch within the display area of the display screen. The touch panel may detect the touch of a finger and/or the touch of a passive object, such as a stylus.

Components of the stereoscopic imaging device 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, any software instructions may be stored in memory (not specifically shown) in the stereoscopic imaging device 100 and executed by one or more processors. The software instructions may be initially stored in a computer-readable medium such as a compact disc (CD), a diskette, a tape, a file, memory, or any other computer readable storage device and loaded and stored on the stereoscopic imaging device 100. In some cases, the software instructions may also be sold in a computer program product, which includes the computer-readable medium and packaging materials for the computer-readable medium. In some cases, the software instructions may be distributed to the stereoscopic imaging device 100 via removable computer readable media (e.g., floppy disk, optical disk, flash memory, USB key), via a transmission path from computer readable media on another computer system (e.g., a server), etc.

FIGS. 2, 5, 7, 9, 11, and 14 show flow diagrams of methods for automatic focusing that may be implemented by the stereoscopic imaging device 100 of FIG. 1. These methods are described with respect to the stereoscopic imaging device 100 merely for illustration. As will be apparent to one of ordinary skill in the art having benefit of the disclosure provided herein, the methods can be implemented in other devices and using other components.

Figure 2:
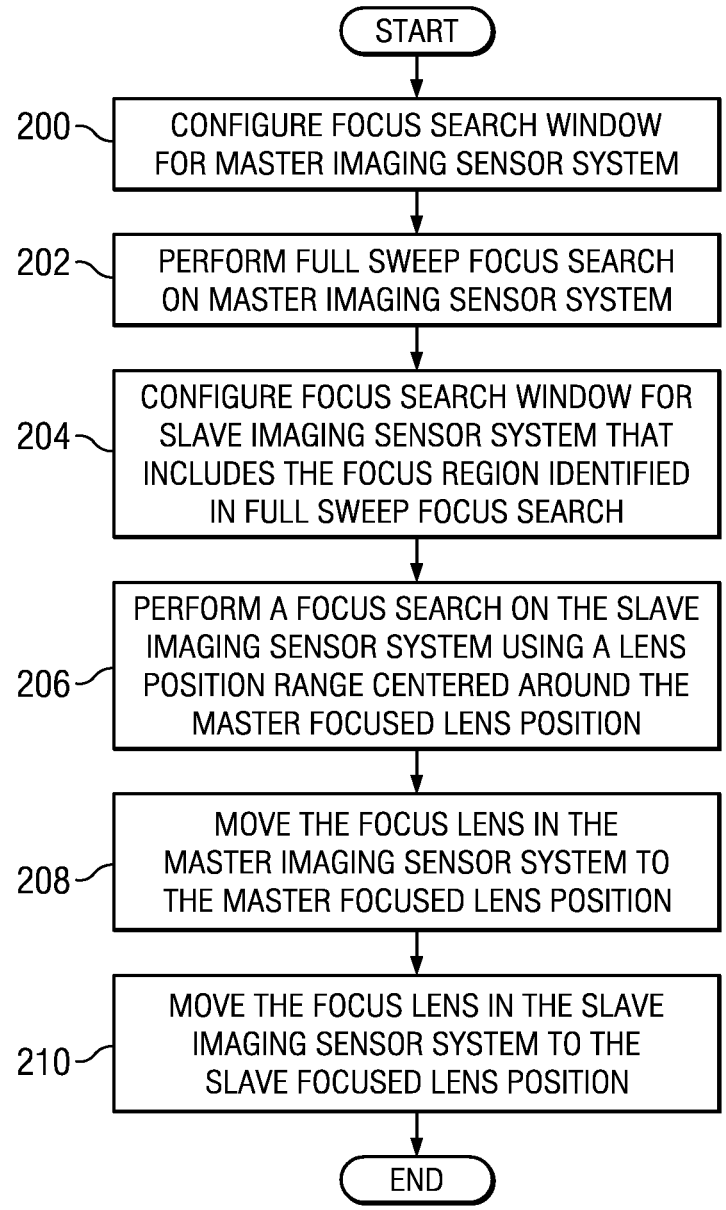
FIGS. 2, 5, 7, 9, 11, and 14 show flow diagrams of methods for automatic focus in a stereoscopic imaging device.

In the method of FIG. 2, one of the imaging sensor systems 116, 118 is considered to be the master imaging sensor system and the other is considered to be the slave imaging sensor system. Further, although not specifically shown in the flow diagram, if focusing fails when using one particular imaging sensor system as the master and the other as the slave, the roles of the imaging sensor systems can be reversed, and the method repeated. For simplicity of explanation, the master imaging sensor system is assumed to be the left imaging sensor system 116.

As shown in FIG. 2, initially a focus search window is configured for the master imaging sensor system 200. This configuration is performed by the auto focus component 108. That is, the auto focus component 108 provides the dimensions of the focus search window and the paxel dimensions to the focus statistics component 106. The size of the focus search window and the paxel sizes may be predetermined and/or may be user specified. Note that smaller paxel sizes may provide better spatial accuracy for focusing at the cost of increased complexity.

A full sweep focus search is then performed on the master imaging sensor system 116 to determine a focused lens position 202. A full sweep focus search is a focus search across the full lens position range of the master imaging sensor system 116, i.e., from the closest or near lens position to the far or infinite lens position or vice versa. For simplicity of explanation, this search is described as sweeping from the far lens position to the near lens position. The granularity of this focus search, i.e., the number of lens positions considered in the search and the spacing between the lens positions, may be predetermined and/or may be user specified.

To perform the full sweep focus search, the auto focus component 108 via the lens driver 110 moves the focus lens 124 to the far lens position. The master imaging sensor system 116 captures image data at this lens position, which is processed by the preview processing component 104, and passed to the focus statistics component 106. The focus statistics component 106 computes the paxel focal scores for the left frame. The auto focus component 108 then determines a frame focal score from the paxel focal scores. This frame focal score corresponds to a focus region in the frame with the highest focal score. Note that the slave imaging sensor 118 may also simultaneously capture image data that is processed by the preview processing component 104 and the focus statistics component 106. The auto focus component 108 ignores the paxel focal scores from the right frame while performing the master full sweep focus search.

The auto focus component 108 moves the focus lens 124 to the next lens position, image data is captured by the master imaging sensor system 116 at the new lens position, paxel focal scores for the left frame are determined by the focus statistics component 106, and the auto focus component 108 determines a frame focal score from the paxel focal scores. The moving of the focus lens 124, image data capture, paxel score determination, and frame focal score determination are repeated under the control of the auto focus component 108 through the near lens position. The auto focus component 108 selects the lens position with the maximum frame focal score as the focused lens position for the master imaging sensor system 116.

A focus search window is then configured for the slave imaging sensor system 118 that includes the focus region corresponding to the maximum frame focal score from the master full sweep focus search 204. That is, the auto focus component 108 determines a focus search window that includes the paxel(s) of the focus region. In one embodiment, the focus search window may be limited to the focus region. In one embodiment, a border of paxels neighboring the focus region is also included in the focus search window to accommodate the disparity between the two imaging sensor systems. The number and locations of paxels other than those in the focus region that are included in the focus search window may be determined in any suitable manner. In some such embodiments, the focus search window is centered on the focus region as much as possible considering the frame boundaries. The auto focus component 108 provides the dimensions of the focus search window to the focus statistics component 106.

A fine sweep focus search is then performed on the slave imaging sensor system 118 using a lens position range centered (as much as possible within the full lens position range) around the master focused lens position 206. In this context, a fine sweep focus search is a focus search across a lens position range smaller than the full lens position range and with finer spacing between the lens positions than the full sweep focus search. The granularity of the fine sweep focus search may be predetermined and/or may be user specified and/or may be dynamically determined. A fine sweep search may be performed from the most distant lens position in the lens position range to the closest lens position in the lens position range or vice versa. For simplicity of explanation, this search is described as sweeping from the most distant lens position to the closest lens position.

To perform the fine sweep focus search, the auto focus component 108 via the lens driver 112 moves the focus lens 126 to the most distant lens position in the lens position range. The slave imaging sensor system 118 captures image data at this lens position, which is processed by the preview processing component 104 and passed to the focus statistics component 106. The focus statistics component 106 computes the paxel focal scores for the right frame. The auto focus component 108 then determines a frame focal score from the paxel focal scores. This frame focal score corresponds to a focus region in the right frame with the highest focal score. Note that the master imaging sensor 116 may also simultaneously capture image data that is processed by the preview processing component 104 and the focus statistics component 106. The auto focus component 108 ignores the paxel focal scores from the left frame while performing the slave fine sweep focus search.

The auto focus component 108 moves the focus lens 126 to the next lens position, image data is captured by the slave imaging sensor system 118 at the new lens position, paxel focal scores for the right frame are determined by the focus statistics component 106, and the auto focus component 108 determines a frame focal score from the paxel focal scores. The moving of the focus lens 126, image data capture, paxel score determination, and frame focal score determination are repeated under the control of the auto focus component 108 through the closest lens position. The auto focus component 108 selects the lens position with the maximum frame focal score as the focused lens position for the slave imaging sensor system 118.

The focus lens in the master imaging sensor system 116 is then moved to the master focused lens position determined by the full sweep focus search 208 and the focus lens in the slave imaging sensor system 118 is moved to the slave focused lens position determined by the fine sweep focus search 210. More specifically, the auto focus component 108 via the lens drivers 110, 112 causes the movement of the respective lenses to their respective focused lens positions.

Figure 3:
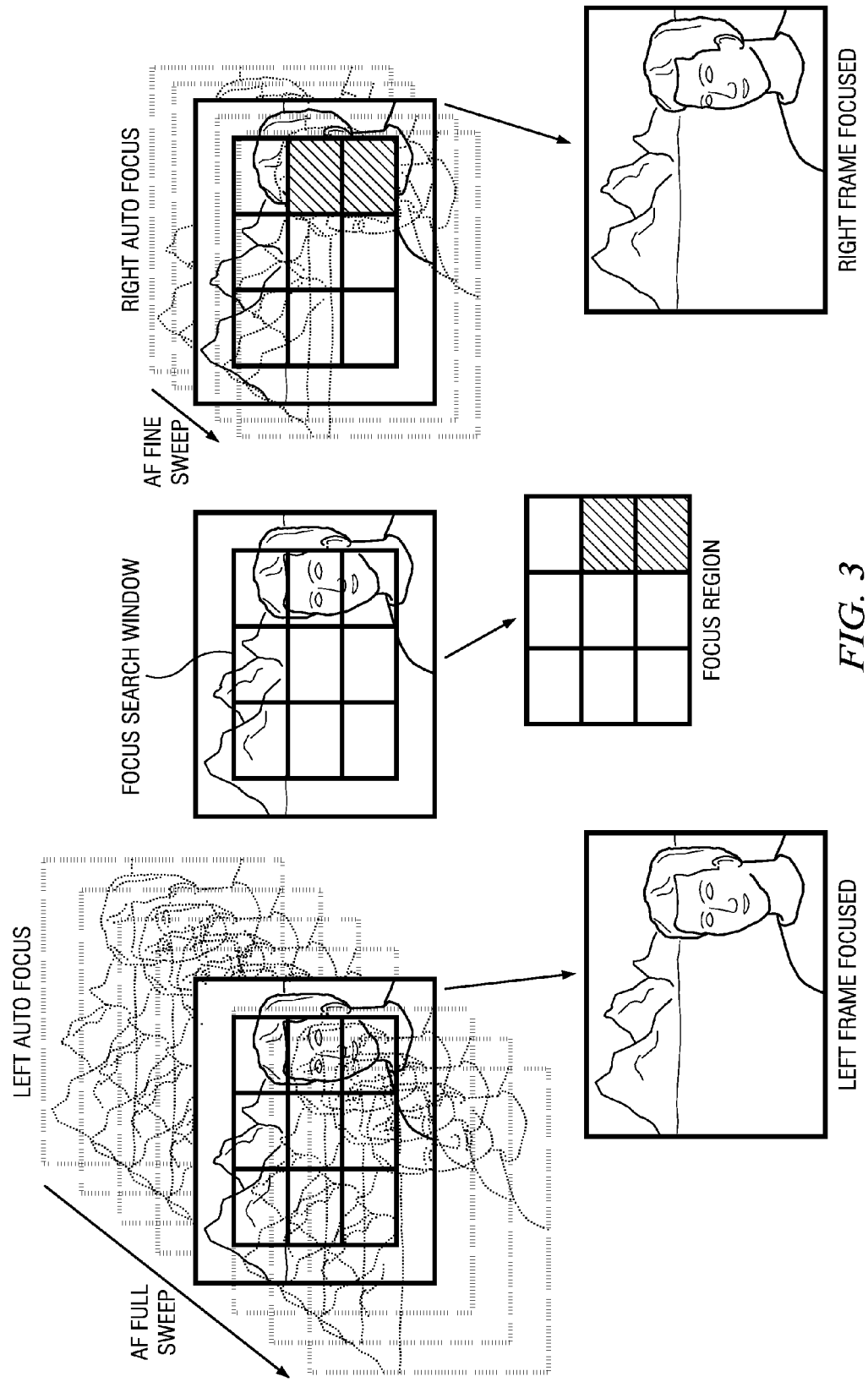
FIGS. 3, 4, 6, 8, 10, 12, 13, and 15 show examples illustrating the methods of FIGS. 2, 5, 7, 9, 11, and 14.
Figure 4A:
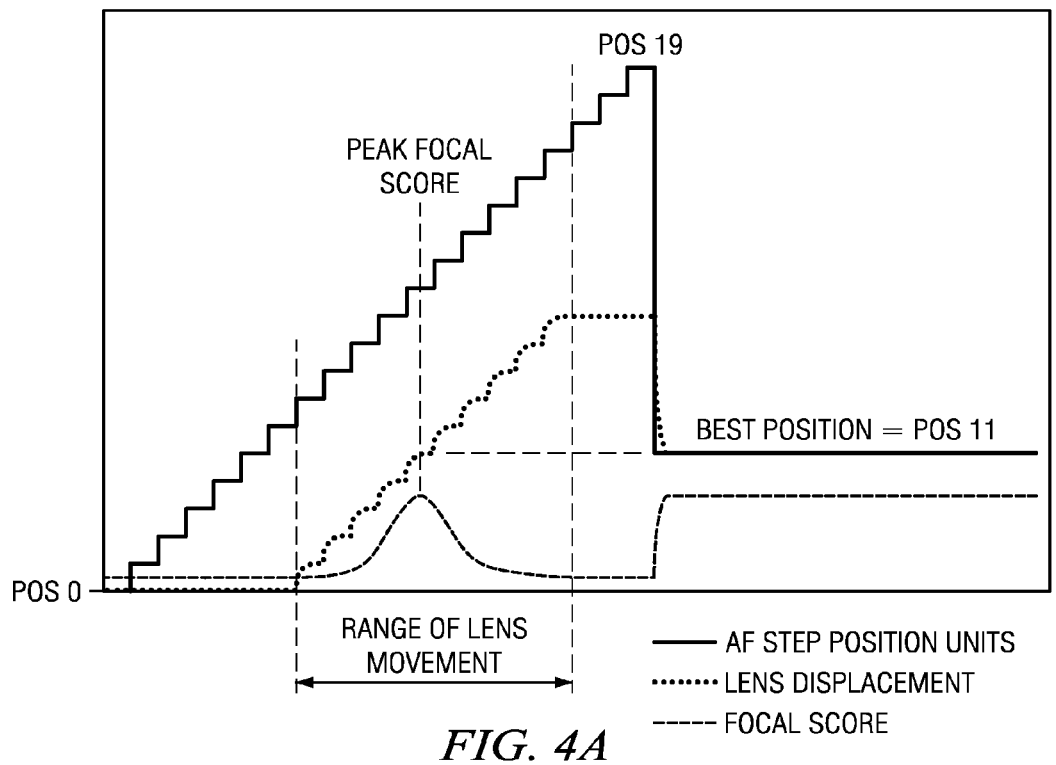
Figure 4B:
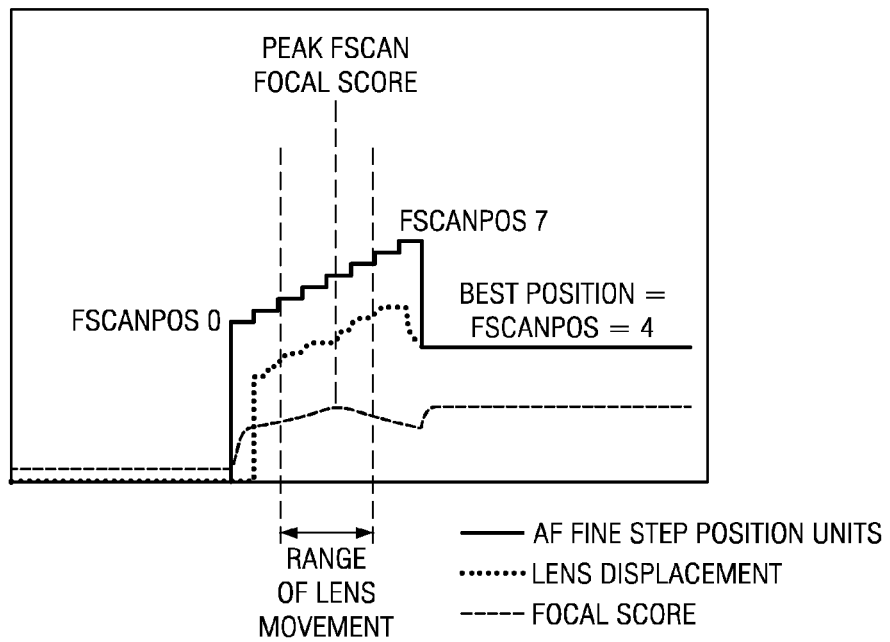

FIG. 3 shows a simplified example of the method of FIG. 2 in which the left imaging sensor system is considered to be the master imaging sensor system and the focus searches move from the most distant position in the lens position range to the closest position in the lens position range. Note that in practice more than nine paxels may be used in a focus search window. FIGS. 4A and 4B show graphs illustrating, respectively, an example full sweep focus search on a master imaging sensor system and an example fine sweep focus search on a slave imaging sensor system in accordance with the method of FIG. 2. Note that the focused lens positions for the master imaging sensor system and the slave imaging sensor system may be close, but are not necessarily the same. In these examples, POS and FSCANPOS are indices of lens positions within the particular lens positions range used for the focus search.

Figure 5:
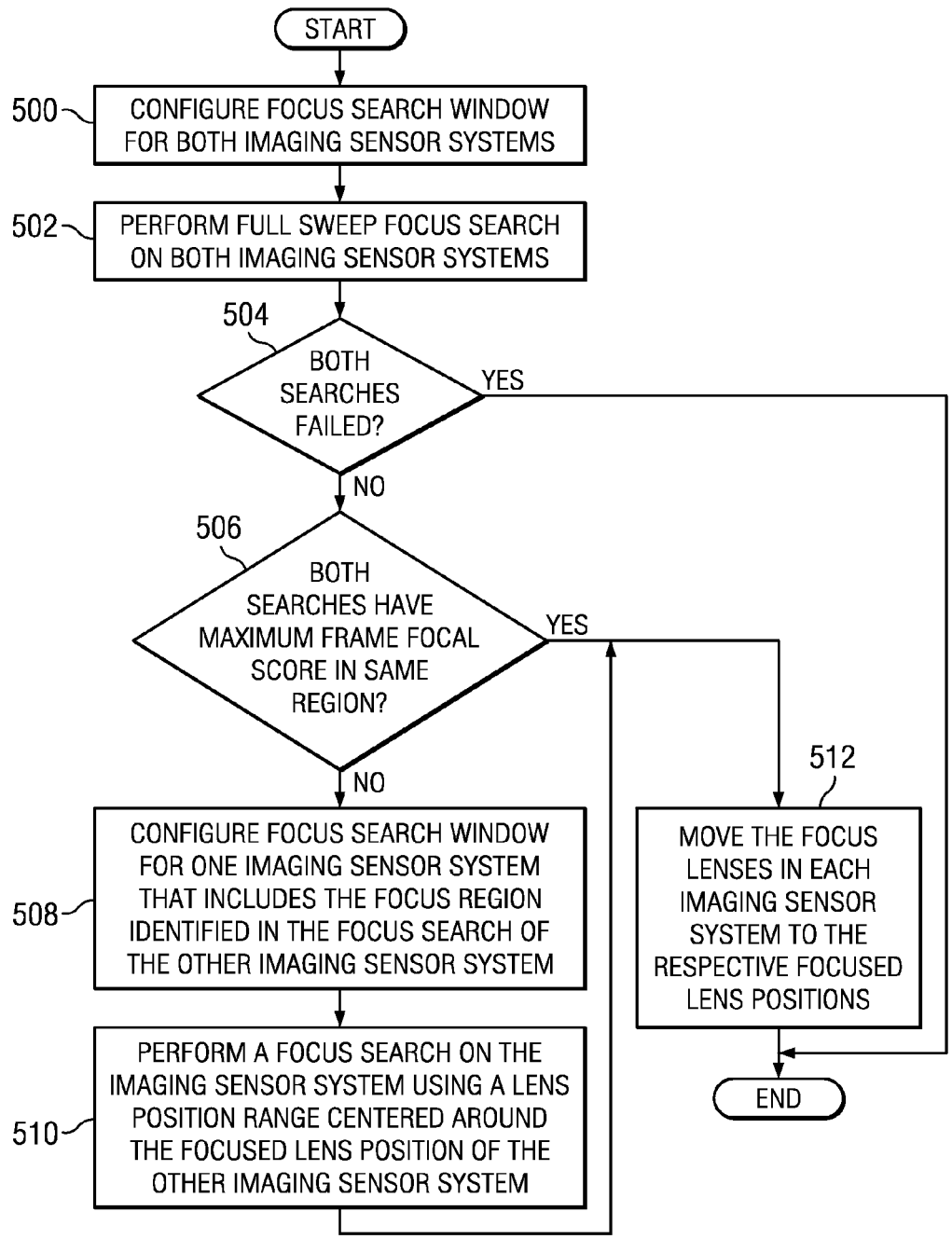

Referring now to the method of FIG. 5, initially a focus search window is configured for both imaging sensor systems 500. This configuration is performed by the auto focus component 108. That is, the auto focus component 108 provides the dimensions of the focus search window and the paxel dimensions to the focus statistics component 106. The size of the focus search window and the paxel sizes may be predetermined and/or may be user specified.

Concurrent full sweep focus searches are then performed on the imaging sensor systems 502. For simplicity of explanation, the focus searches are described as sweeping from the far lens position to the near lens position. The granularity of the focus searches, i.e., the number of lens positions considered in the search and the spacing between the lens positions, is the same for both imaging sensor systems 116, 118 and may be predetermined and/or may be user specified.

To perform the full sweep focus searches, the auto focus component 108 via the lens drivers 110, 112 moves the focus lenses 124, 126 to the far lens position. The imaging sensor systems 116, 118 capture image data at this lens position, which is processed by the preview processing component 104, and passed to the focus statistics component 106. The focus statistics component 106 computes the paxel focal scores for the left frame and the right frame. The auto focus component 108 then determines a frame focal score for each of the left frame and the right frame from the respective paxel focal scores. The frame focal scores correspond to focus regions in the frames with the highest focal score.

The auto focus component 108 moves the focus lenses 124, 126 to the next lens position, image data is captured by the imaging sensor systems 116, 118 at the new lens position, paxel focal scores for the left and right frames are determined by the focus statistics component 106, and the auto focus component 108 determines the frame focal scores from the paxel focal scores. The moving of the focus lens 124, image data capture, paxel score determination, and frame focal score determination are repeated under the control of the auto focus component 108 through the near lens position. The auto focus component 108 selects the lens position with the maximum frame focal score from the focus search of the left imaging sensor system 116 as the focused lens position for the left imaging sensor system 116 and the lens position with the maximum frame focal score from the focus search of the right imaging sensor system 118 as the focused lens position for the right imaging sensor system 118.

After the full sweep focus searches, a determination is made as to the success of the searches 504. If both searches failed, e.g., because both focal scores were not above a sharpness threshold, the method terminates. Otherwise, a determination is made as to whether the maximum frame focal score from the left and right focus searches corresponds to the same focus region between the left and right frames 506. In other words, a determination is made as to whether the sharpest paxels in the optimal left frame and optimal right frame are in the same spatial location. Both of these determinations are performed by the auto focus component 108. If the left and right maximum frame focal scores correspond to the same focus region 506, the lenses 124, 126 are moved to their respective focused lens positions 512 and the method terminates. More specifically, the auto focus component 108 via the lens drivers 110, 112 causes the movement of the respective lenses to their respective focused lens positions as determined by the left and right focus searches.

If the left and right maximum frame focal scores do not correspond to the same focus region 506, a focus search window for one of the imaging sensor systems is configured that includes the focus region corresponding to the maximum frame focal score identified in the focus search of the other imaging sensor system 508. That is, the auto focus component 108 determines a focus search window that includes the paxel(s) of the focus region. The auto focus component 108 provides the dimensions of the focus search window to the focus statistics component 106. The determination of a focus search window is previously described herein in reference to FIG. 2.

For this search window configuration, one of the imaging sensor subsystems 116, 118 is considered to be the master imaging sensor system and the other is considered to be the slave imaging sensor system. Which imaging sensor system is to be the master and which is to be the slave may be determined in any suitable way. For example, the imaging sensor system with the highest maximum frame focal score may be used as the master imaging sensor system. In another example, the left imaging sensor system or the right imaging sensor system may be the default choice for the master. For simplicity of explanation, the master imaging sensor system is assumed to be the left imaging sensor system 116. Accordingly, the auto focus component 108 determines a focus search window for the right or slave imaging sensor system 118 that includes the focus region corresponding to the maximum frame focal score from the focus search of the left or master imaging sensor system 116.

A fine sweep focus search is then performed on the slave imaging sensor system 118 using a lens position range centered (as much as possible within the full lens position range) around the master focused lens position 510. For simplicity of explanation, this search is described as sweeping from the most distant lens position in the lens position range to the closest lens position. The fine sweep focus search is performed as previously described herein in reference to FIG. 2. The auto focus component 108 selects the lens position with the maximum frame focal score as the focused lens position for the slave imaging sensor system 118.

The lenses 124, 126 are then moved to their respective focused lens positions 512 and the method terminates. That is, the focus lens 124 in the master imaging sensor system 116 is moved to the focused lens position determined by the initial full sweep focus search on the master imaging sensor system 116 and the focus lens 126 in the slave imaging sensor system 118 is moved to the focused lens position determined by the fine sweep focus search of the slave imaging sensor system 118. The auto focus component 108 via the lens drivers 110, 112 causes the movement of the respective lenses to their respective focused lens positions.

Figure 6:
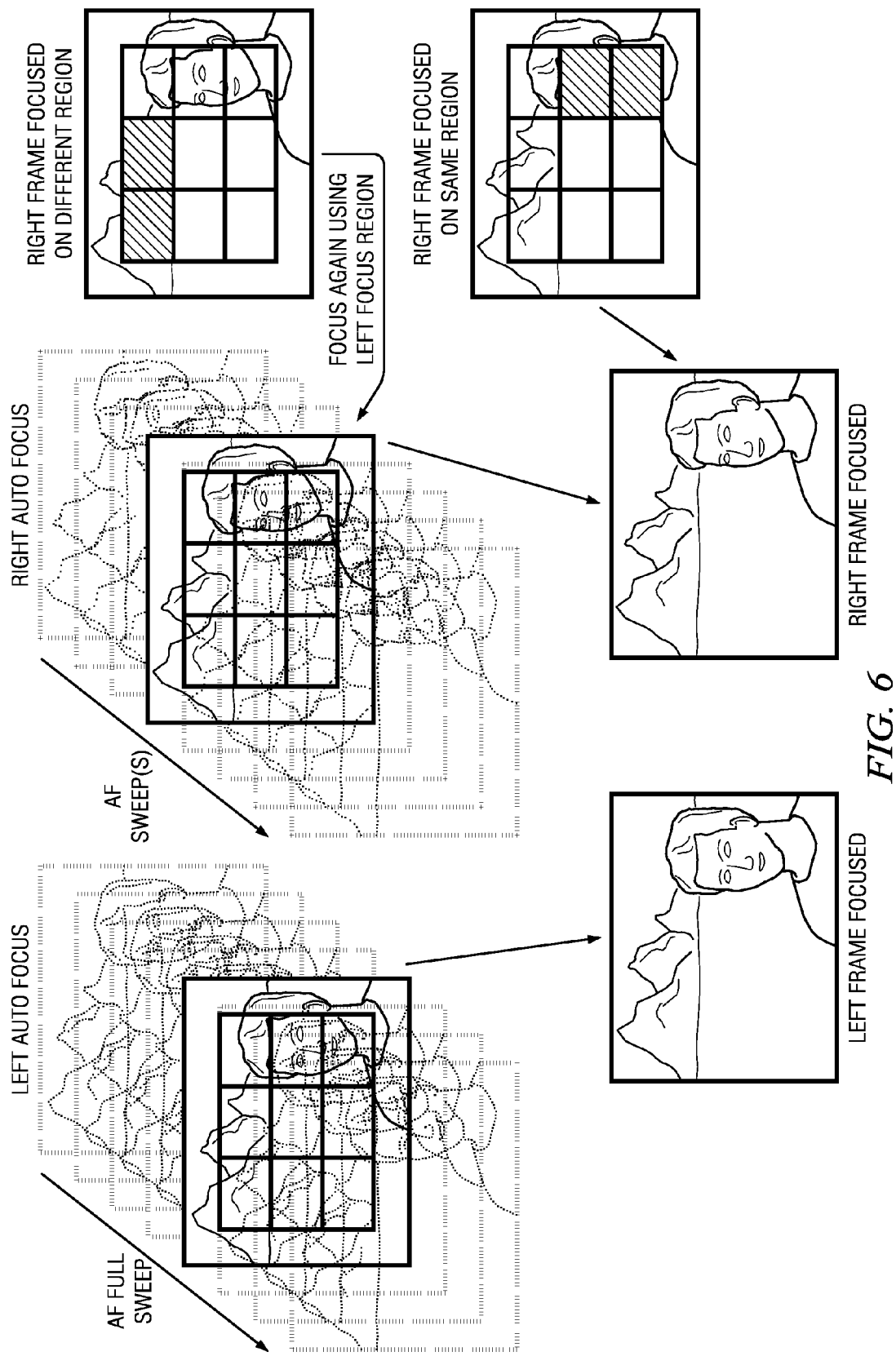

FIG. 6 shows a simplified example of the method of FIG. 5 in which the left imaging sensor system is considered to be the master imaging sensor system and the focus searches move from the closest position in the lens position range to the most distant position in the lens position range. Note that in practice more than nine paxels may be used in a focus search window.

Figure 7:
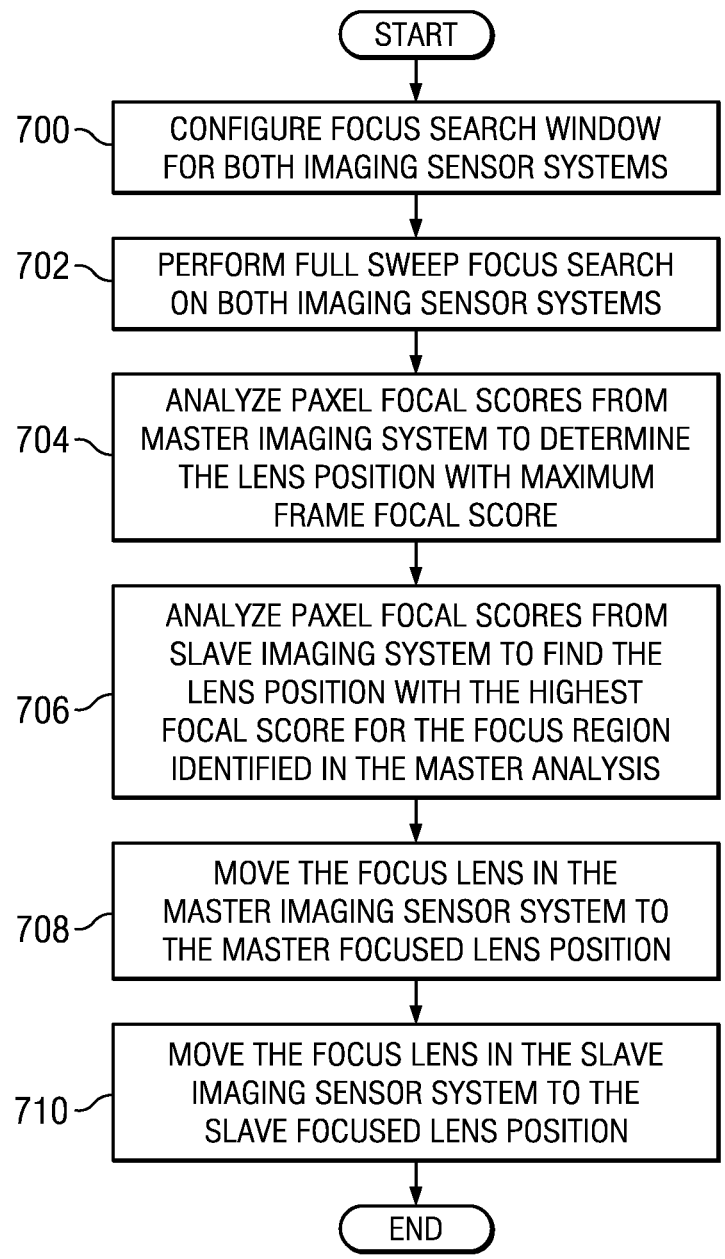

Referring now to the method of FIG. 7, one of the imaging sensor systems 116, 118 is considered to be the master imaging sensor system and the other is considered to be the slave imaging sensor system. The choice of which imaging sensor subsystem is considered to be the master and which is considered to be the slave is implementation dependent. For simplicity of explanation, the master imaging sensor system is assumed to be the left imaging sensor system 116.

As shown in FIG. 7, initially a focus search window is configured for both imaging sensor systems 700. This configuration is performed by the auto focus component 108. That is, the auto focus component 108 provides the dimensions of the focus search window and the paxel dimensions to the focus statistics component 106. The size of the focus search window and the paxel sizes may be predetermined and/or may be user specified.

Concurrent full sweep focus searches are then performed on the imaging sensor systems 702. For simplicity of explanation, the focus searches are assumed to sweep from the far lens position to the near lens position. The granularity of the focus searches, i.e., the number of lens positions considered in the search and the spacing between the lens positions, is the same for both imaging sensor systems 116, 118 and may be predetermined and/or may be user specified. The focus searches are performed as previously described herein in reference to FIG. 5 except that rather than determining a frame focal score for frames at each lens position in the focus search, the paxel focal scores for each lens position for each image sensor system are stored by the auto focus component 108, e.g., in three dimensional matrix representations of the paxel focal scores.

After the full sweep focus searches are completed, the stored paxel focal scores from the master focus search are analyzed to determine the lens position with the maximum frame focal score 704. This lens position is selected as the focused lens position for the master imaging sensor system 116. The stored paxel focal scores for the slave focus search are then analyzed to determine the lens position with maximum frame focal score for the focus region corresponding to the master maximum frame focal score 706. Both of these analyses are performed by the auto focus component 108. This lens position is selected as the focused lens position for the slave imaging sensor system 118.

The focus lens in the master imaging sensor system 116 is then moved to the master focused lens position 708 and the focus lens in the slave imaging sensor system 118 is moved to the slave focused lens position 710. More specifically, the auto focus component 108 via the lens drivers 110, 112 causes the movement of the respective lenses to their respective focused lens positions.

Figure 8:
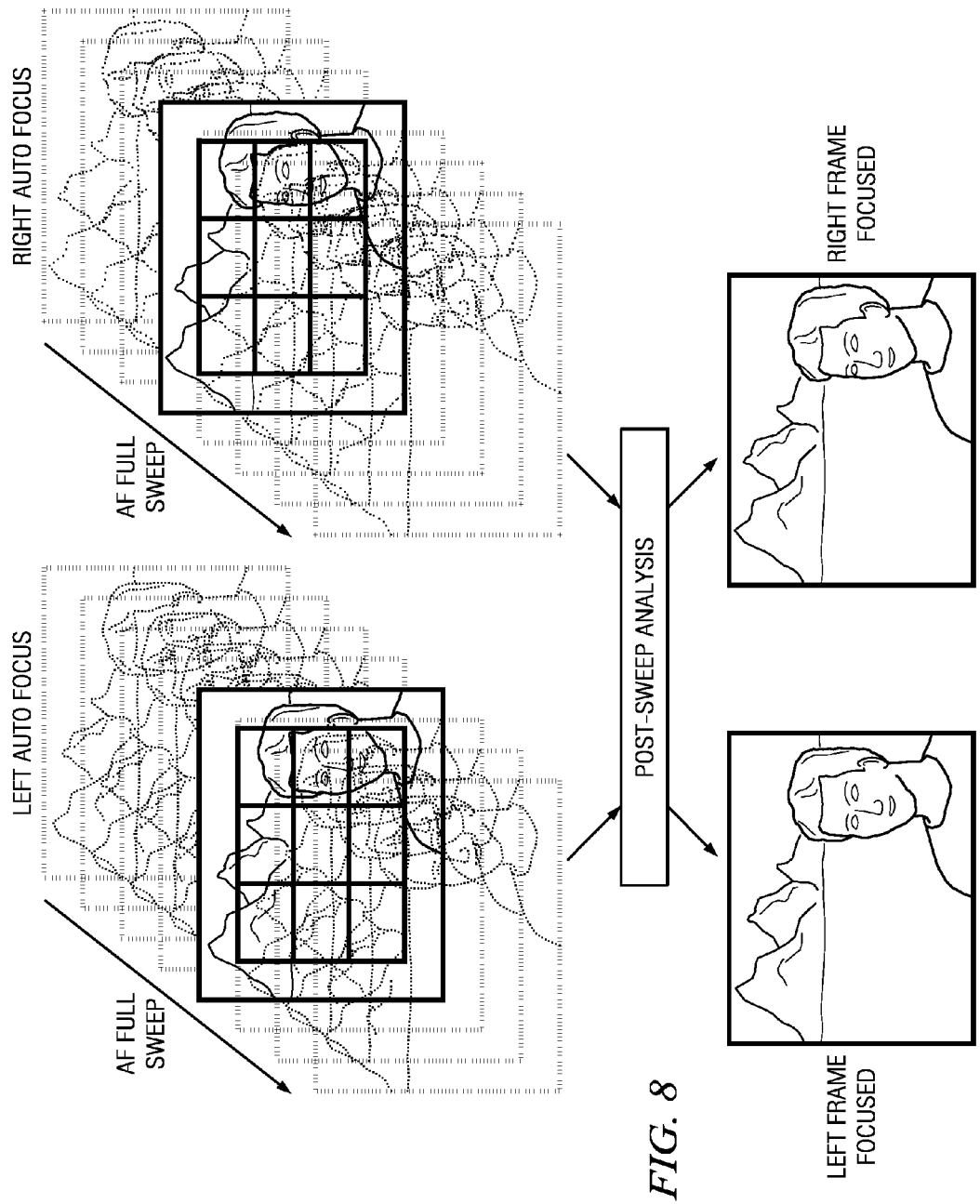

FIG. 8 shows a simplified example of the method of FIG. 7. The offline analysis refers to the analysis performed on the paxel focal scores by the auto focus component 108 after the full sweep searches.

Figure 9:
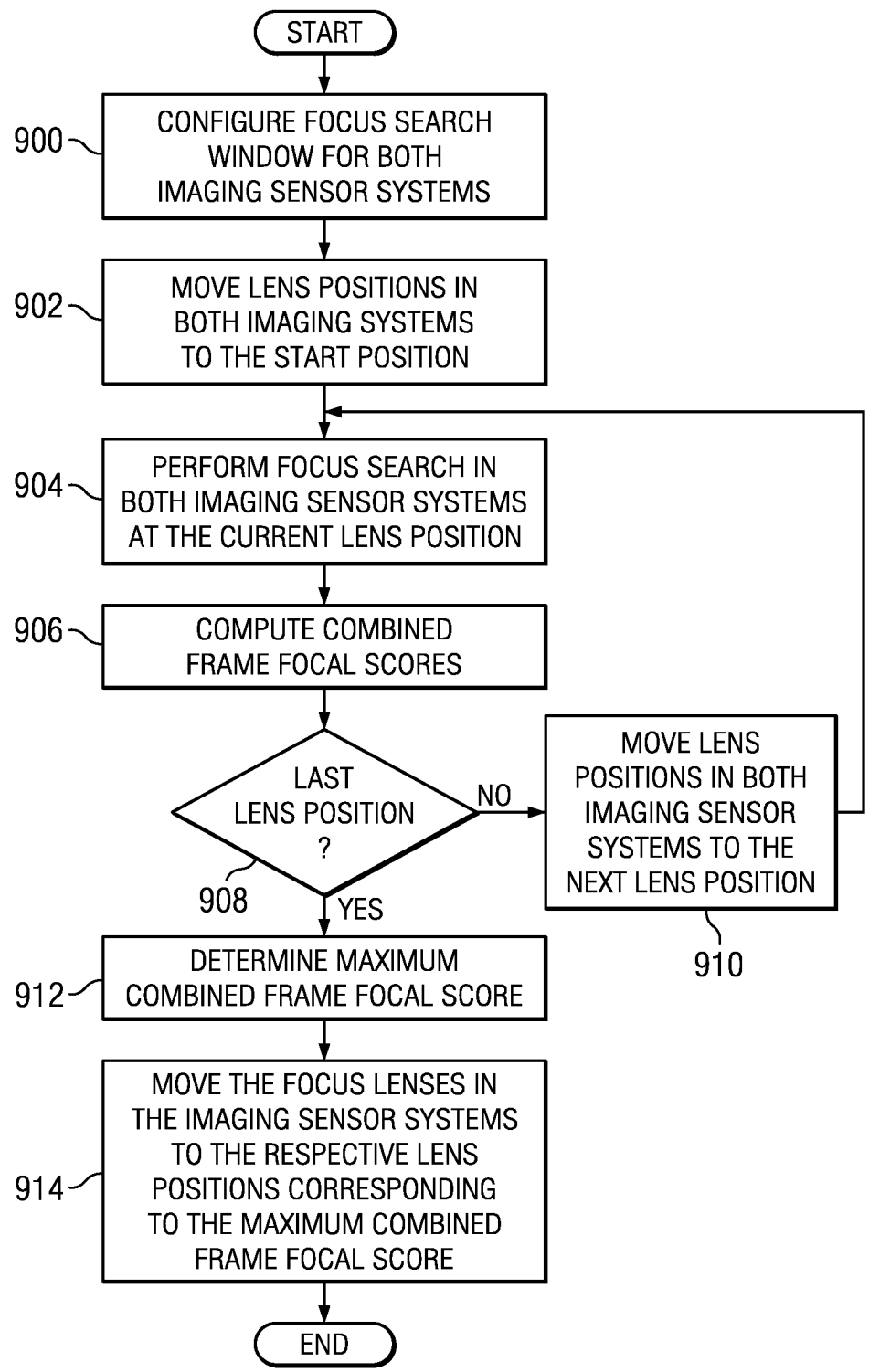

In the method of FIG. 9, initially a focus search window is configured for both imaging sensor systems 900. This configuration is performed by the auto focus component 108. That is, the auto focus component 108 provides the dimensions of the focus search window and the paxel dimensions to the focus statistics component 106. The size of the focus search window and the paxel sizes may be predetermined and/or may be user specified. Concurrent full sweep focus searches are then performed on the imaging sensor systems 902-910. For simplicity of explanation, the focus searches are assumed to sweep from the far lens position to the near lens position. The granularity of the focus searches, i.e., the number of lens positions considered in the search and the spacing between the lens positions, is the same for both imaging sensor systems 116, 118 and may be predetermined and/or may be user specified.

The focus searches are performed as previously described herein in reference to FIG. 5, moving from the far lens position to the near lens position 902 -910, except that combined frame focal scores are computed at each lens position 906. More specifically, at each lens position, the auto focus component 108 determines a frame focal score for each of the left frame and the right frame. Then, the auto focus component 108 determines one or more combined frame focal scores. Any suitable technique for determining combined frame focal scores may be used. In one embodiment, a combined frame focal score is computed as $(f_l(n)+f_r(n))$ where n is the lens position, $f_l$ is the frame focal score for the left frame at lens position n, and $f_r$ is the frame focal score for the right frame at each sensor's respective lens position n. In this embodiment, there will be one combined frame focal score per lens position. In another embodiment, a combined frame focal score may be computed as $(f_l(n_l)+f_r(n_r))$, $n_l$, $n_r \in N$ where N is the number of lens positions. That is, multiple combined frame focal scores are computed in which each left frame focal score is added to each right frame focal score. For example, in this embodiment, a peak score of the left frame may be saved and compared against future right frame scores in a real-time sweep.

After the focus searches are completed, the maximum combined frame focal score is determined 912. This determination is made by the auto focus component 108. The maximum combined frame focal score is based on a frame focal score from a left frame at a left lens position and a frame focal score from a right frame at a right frame lens position. In some embodiments, the left lens position and the right lens position corresponding to a combined frame focal score may not be the same.

The focus lenses 124, 126 in the imaging sensor systems 116, 118 are then moved to the respective lens positions corresponding to the maximum combined frame focal score. More specifically, the auto focus component 108 selects the left lens position corresponding the maximum combined frame focal score as the focused lens position for the left imaging sensor system 116 and the right lens position corresponding the maximum combined frame focal score as the focused lens position for the right imaging sensor system 116, and causes the respective lenses 124, 126 to be positioned accordingly.

Figure 10:
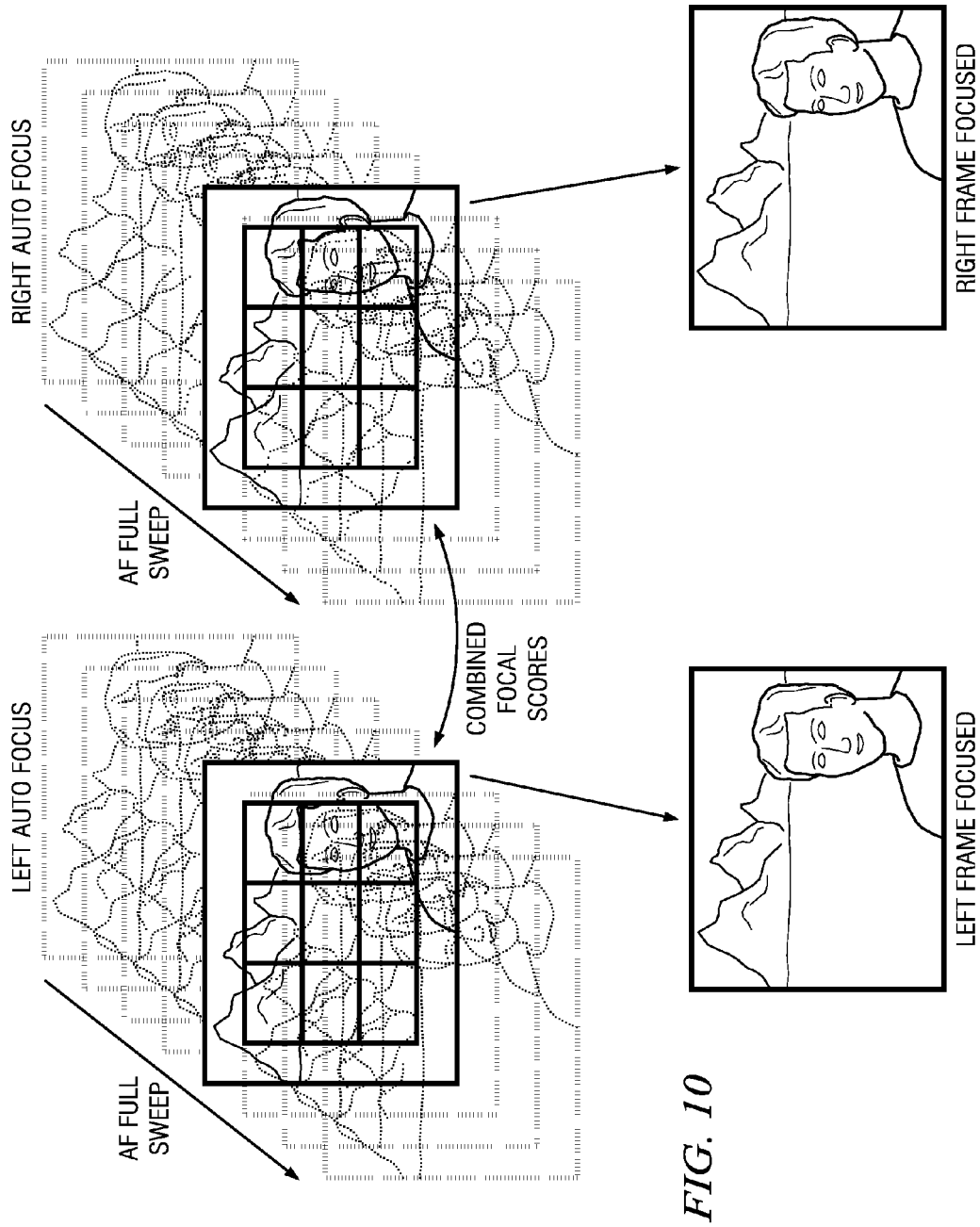

FIG. 10 shows a simplified example of the method of FIG. 9 in which the focus searches move from the far position in the lens position range to the near position in the lens position range. Note that in practice more than nine paxels may be used in a focus search window.

Figure 11:
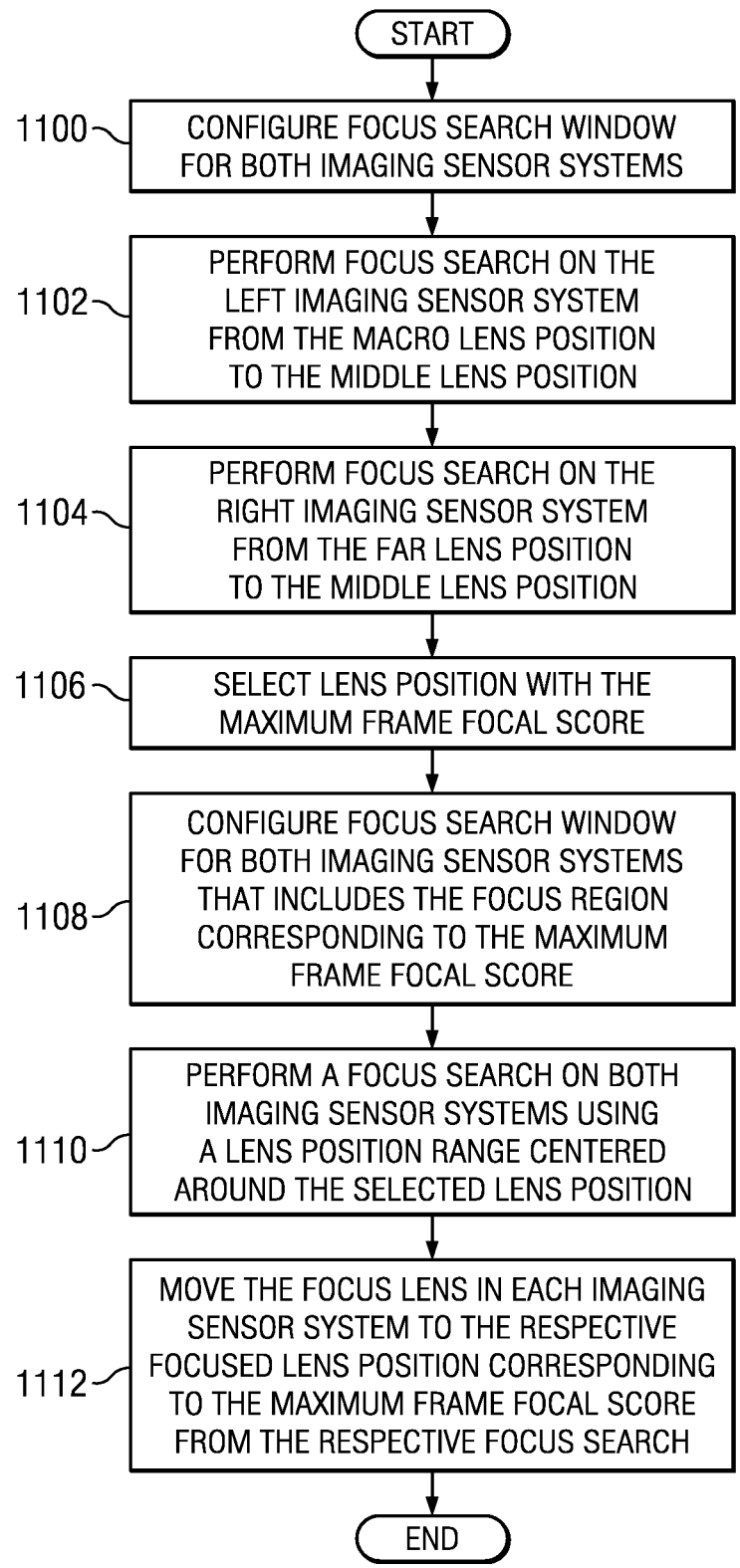

In the method of FIG. 11, initially a focus search window is configured for both imaging sensor systems 1100. This configuration is performed by the auto focus component 108. That is, the auto focus component 108 provides the dimensions of the focus search window and the paxel dimensions to the focus statistics component 106. The size of the focus search window and the paxel sizes may be predetermined and/or may be user specified.

Concurrent half sweep focus searches are then performed on the imaging sensor systems 1102, 1104. In this context, a half sweep focus search is a focus search across half of the full lens position range of the imaging sensor systems 116, 118. That is, a half sweep focus search may be conducted from the far lens position to a middle lens position or from the near lens position to the middle lens position. A half sweep focus search from the far lens position to the middle lens position is performed on one of the imaging sensor subsystems and a half sweep focus search from the near lens position to the middle position is performed on the other imaging sensor subsystem. For simplicity of explanation, the near to middle half sweep search is assumed to be performed on the left imaging sensor subsystem 116 and the far to middle half sweep search is assumed to be performed on the right imaging sensor subsystem 118. The granularity of the focus searches, i.e., the number of lens positions considered in the search and the spacing between the lens positions, is the same for both imaging sensor systems 116, 118 and may be predetermined and/or may be user specified. The half sweep focus searches are performed in a similar fashion to that previously described herein in reference to FIG. 5 for concurrent full sweep focus searches.

After the half sweep focus searches, the lens position with maximum frame focal score is selected 1106. That is, the maximum frame focal score of the frame focal scores from the left half sweep focus search and the frame focal scores of the right half sweep focus search is determined, and the lens position corresponding to this maximum frame focal score is selected. Note that the maximum frame focal score may be from the left half sweep focus search or the right half sweep focus search. These operations are performed by the auto focus component 108.

A secondary focus search window for both imaging sensor systems 116, 118 is configured that includes the focus region with the sharpest paxels in the frame with the maximum frame focal score 1108. That is, the auto focus component 108 determines a secondary focus search window that includes the paxel(s) of the focus region. The auto focus component 108 provides the dimensions of the secondary focus search window to the focus statistics component 106. The determination of a secondary focus search window is previously described herein in reference to FIG. 2.

A fine sweep focus search is then performed on both imaging sensor systems 116, 118 using a lens position range centered (as much as possible within the full lens position range) around the lens position corresponding to the maximum frame focal score 1110. For simplicity of explanation, this search is described as sweeping from the most distant lens position in the lens position range to the closest lens position. The fine sweep focus searches are performed in a similar fashion to that previously described herein in reference to FIG. 2 except that frame focal scores are computed for both the left frame and the right frame at each lens position. The auto focus component 108 selects the lens position with the maximum frame focal score from the left fine sweep focus search as the focused lens position for the left imaging sensor system 116 and the lens position with the maximum frame focal score from the right fine sweep focus search as the focused lens position for the right imaging sensor system 118.

The lenses 124, 126 are then moved to their respective focused lens positions 1112 and the method terminates. That is, the focus lens 124 in the left imaging sensor system 116 is moved to the left focused lens position and the focus lens 126 in the right imaging sensor system 118 is moved to the right focused lens position. The auto focus component 108 via the lens drivers 110, 112 causes the movement of the respective lenses to their respective focused lens positions.

Figure 12:
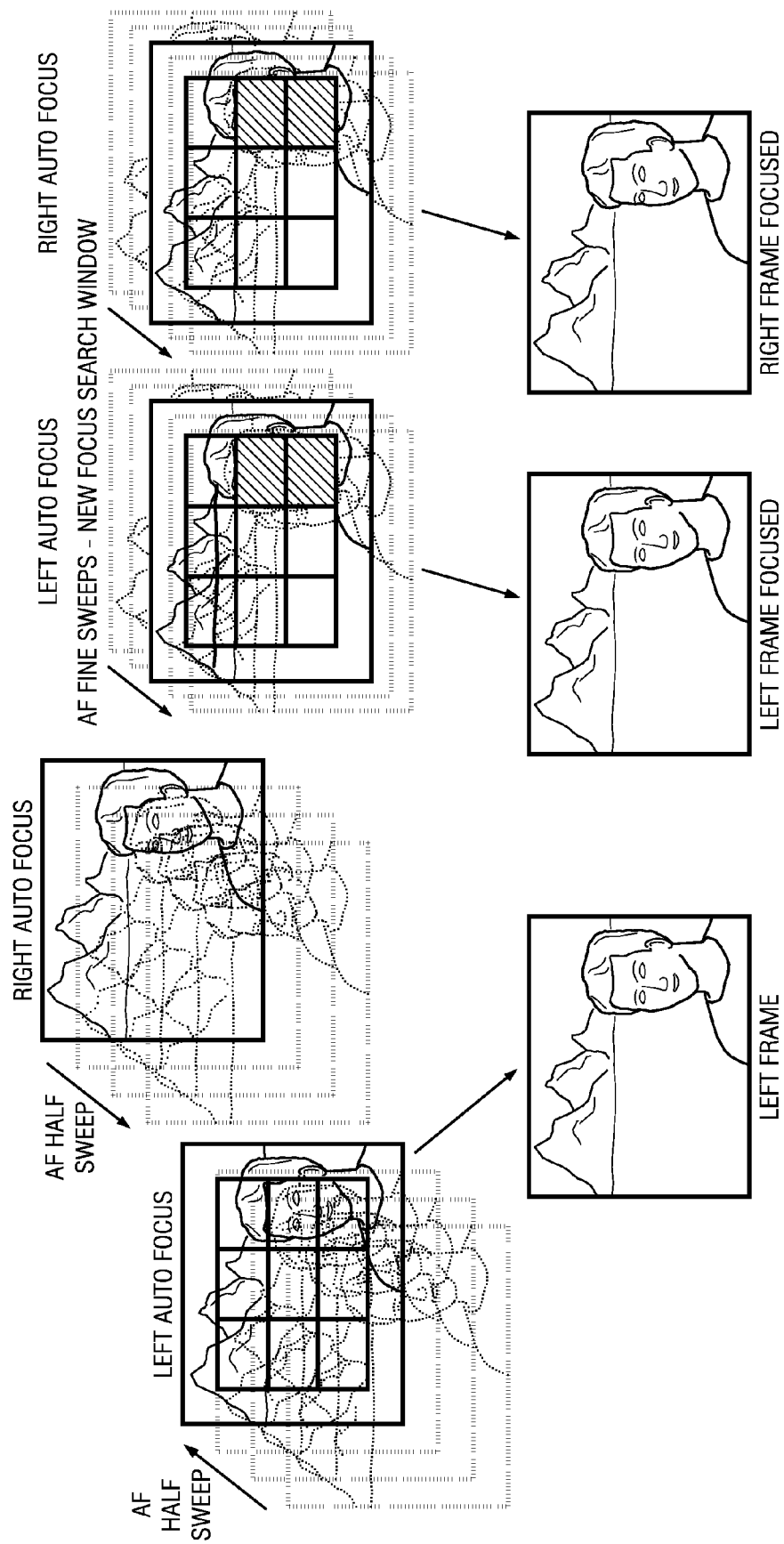

FIG. 12 shows a simplified example of the method of FIG. 11 in which the half sweep focus search on the left imaging sensor system is performed from the near lens position to the middle lens position and the half sweep focus search on the right imaging sensor system is performed from the far lens position to the middle lens position. Further, fine sweep focus searches are performed from the most lens position in the lens position range to the closest lens position. Note that in practice more than nine paxels may be used in a focus search window.

Figure 13A:
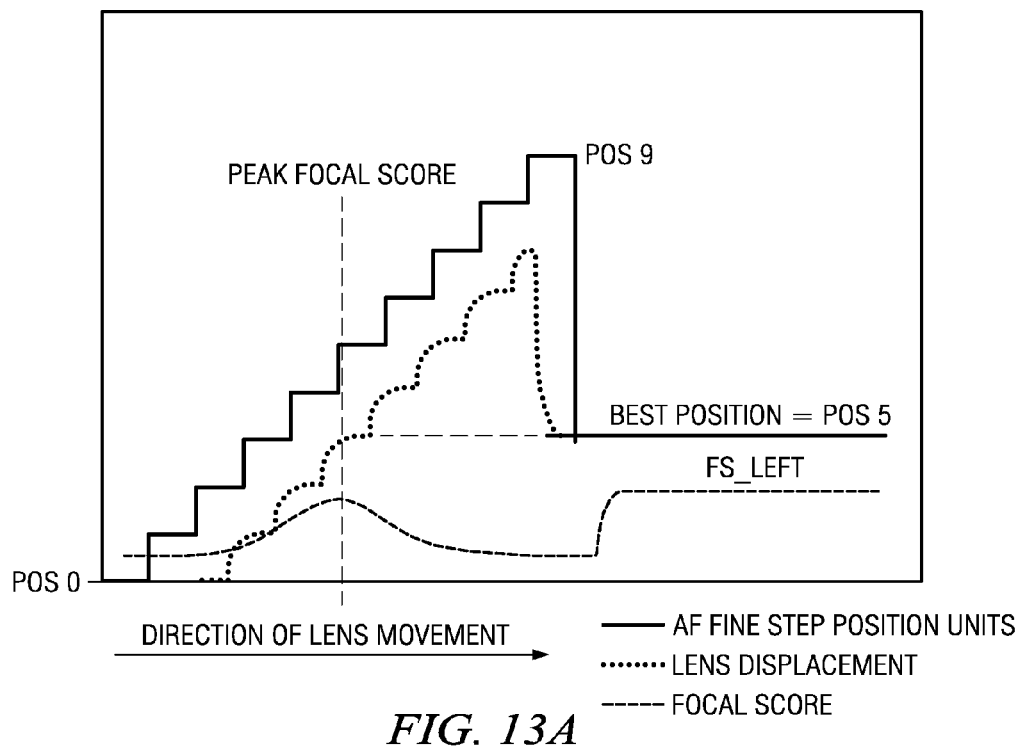
Figure 13B:
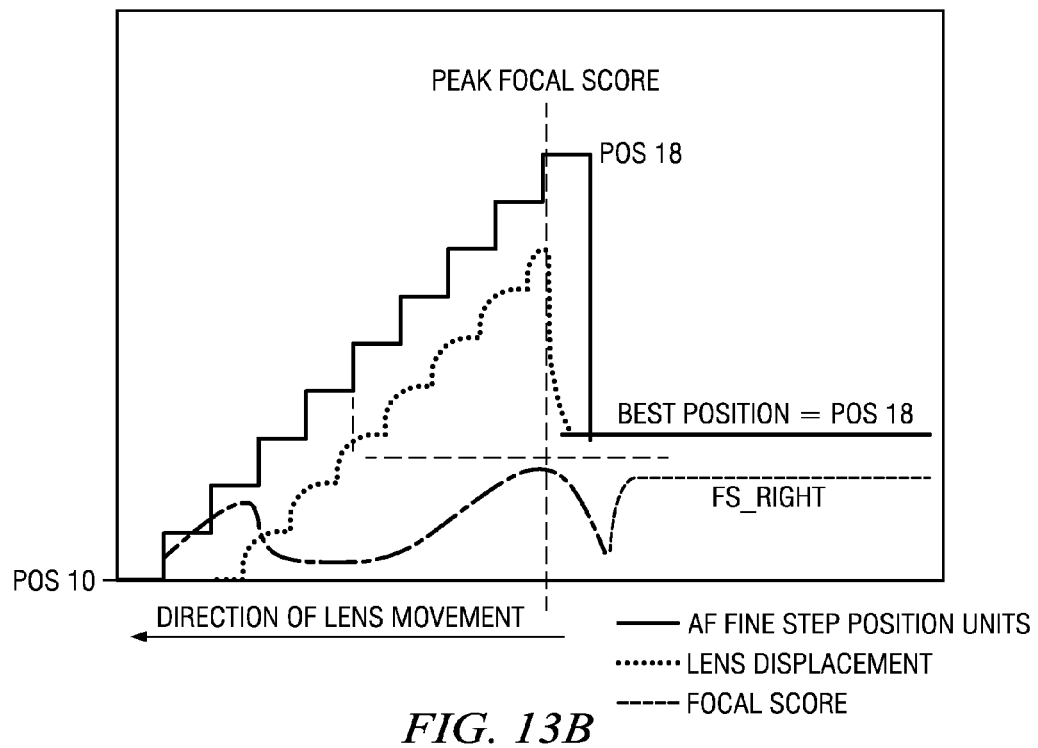
Figure 13C:
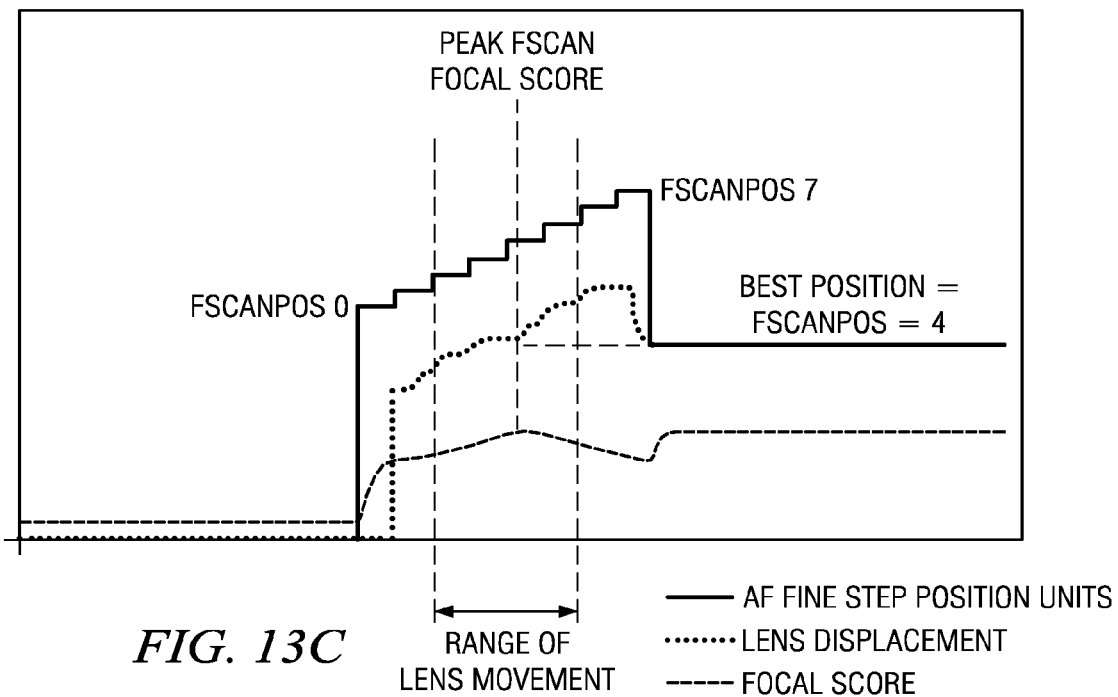

FIGS. 13A-13C show graphs illustrating, respectively, an example half sweep focus search on the left imaging sensor system, an example half sweep focus search on the right imaging sensor system, and an example fine sweep focus search on both imaging sensor systems in accordance with the method of FIG. 11. In these examples, POS and FSCANPOS are indices of lens positions within the particular lens positions ranges used for the focus searches.

Figure 14:
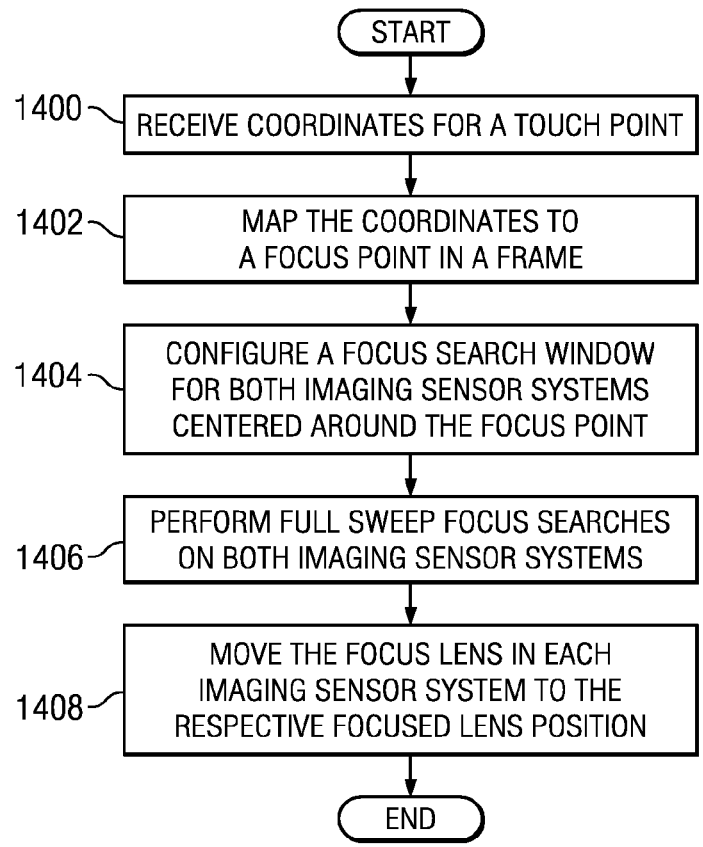

The method of FIG. 14 determines the focused lens positions for the imaging sensor subsystems 116, 118 based on the coordinates of a point on a touchscreen indicated by a user. For purposes of describing this method, an embodiment of the stereoscopic imaging device 100 is assumed in which the stereoscopic display 114 includes a touch panel overlay. The method may be applied in response to a touch event caused by the user touching the screen, for example, while the user is previewing stereoscopic images on the stereoscopic display 114.

Initially, the coordinates of a touch point on the touch screen are received 1400. These coordinates are then mapped to a focus point in a frame 1402. This focus point will be same in both the left and the right frames. A focus search window is then configured for both imaging sensor systems 116, 118 centered on the focus point as much as possible considering the frame boundaries 1404.

Concurrent full sweep focus searches are then performed on the imaging sensor systems 1406. For simplicity of explanation, the focus searches are described as sweeping from the far lens position to the near lens position. The granularity of the focus searches, i.e., the number of lens positions considered in the search and the spacing between the lens positions, is the same for both imaging sensor systems 116, 118 and may be predetermined and/or may be user specified. The full sweep focus searches are performed as previously described herein in reference to FIG. 5. The auto focus component 108 selects the lens position with the maximum frame focal score from the left full sweep focus search as the focused lens position for the left imaging sensor system 116 and the lens position with the maximum frame focal score from the right full sweep focus search as the focused lens position for the right imaging sensor system 118.

The lenses 124, 126 are then moved to their respective focused lens positions 1408 and the method terminates. That is, the focus lens 124 in the left imaging sensor system 116 is moved to the left focused lens position and the focus lens 126 in the right imaging sensor system 118 is moved to the right focused lens position. The auto focus component 108 via the lens drivers 110, 112 causes the movement of the respective lenses to their respective focused lens positions.

Figure 15:
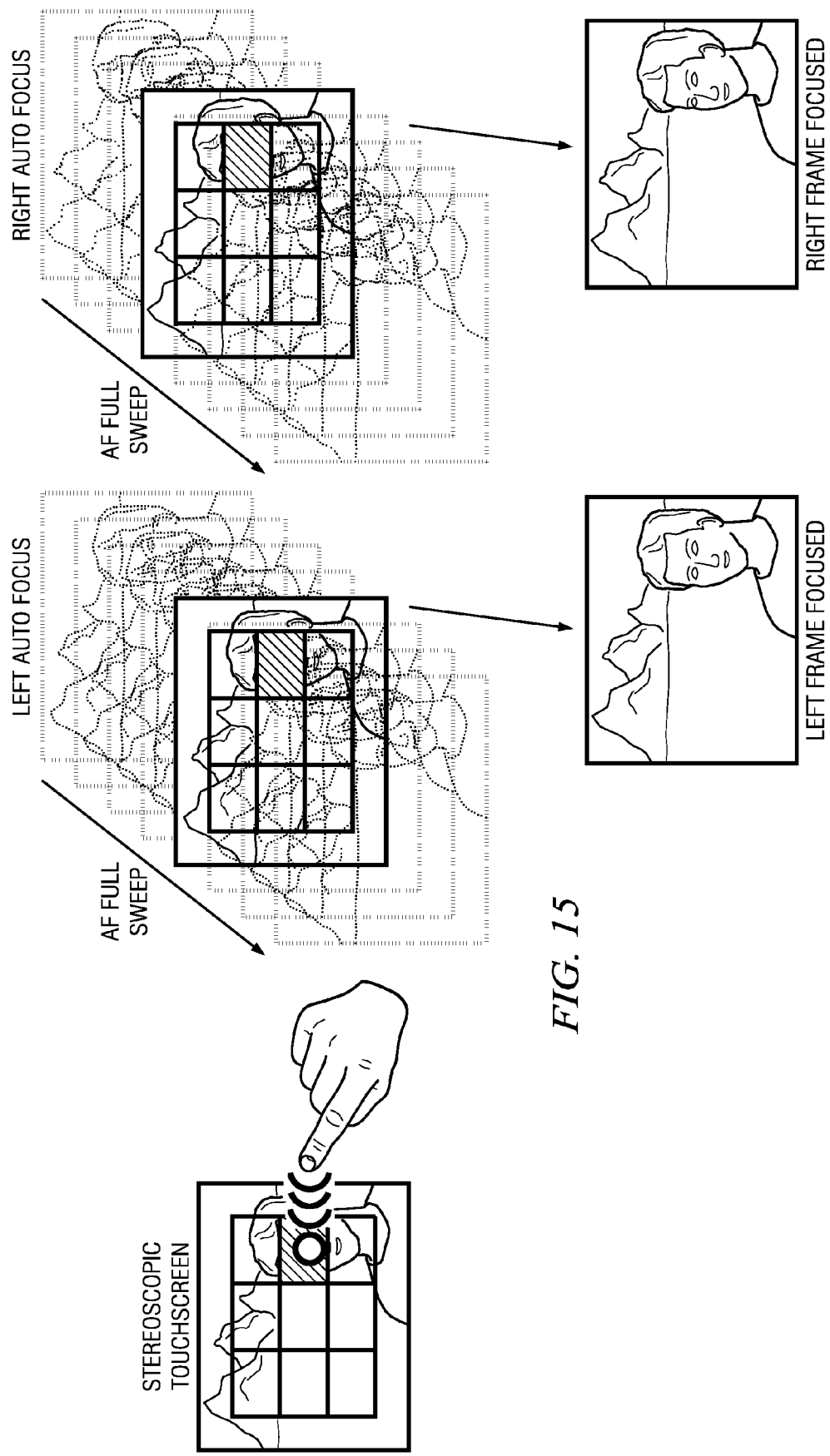

FIG. 15 shows a simplified example of the method of FIG. 14 in which the full sweep focus searches move from the far lens position range to the near lens position. Note that in practice more than nine paxels may be used in a focus search window.

Figure 16:
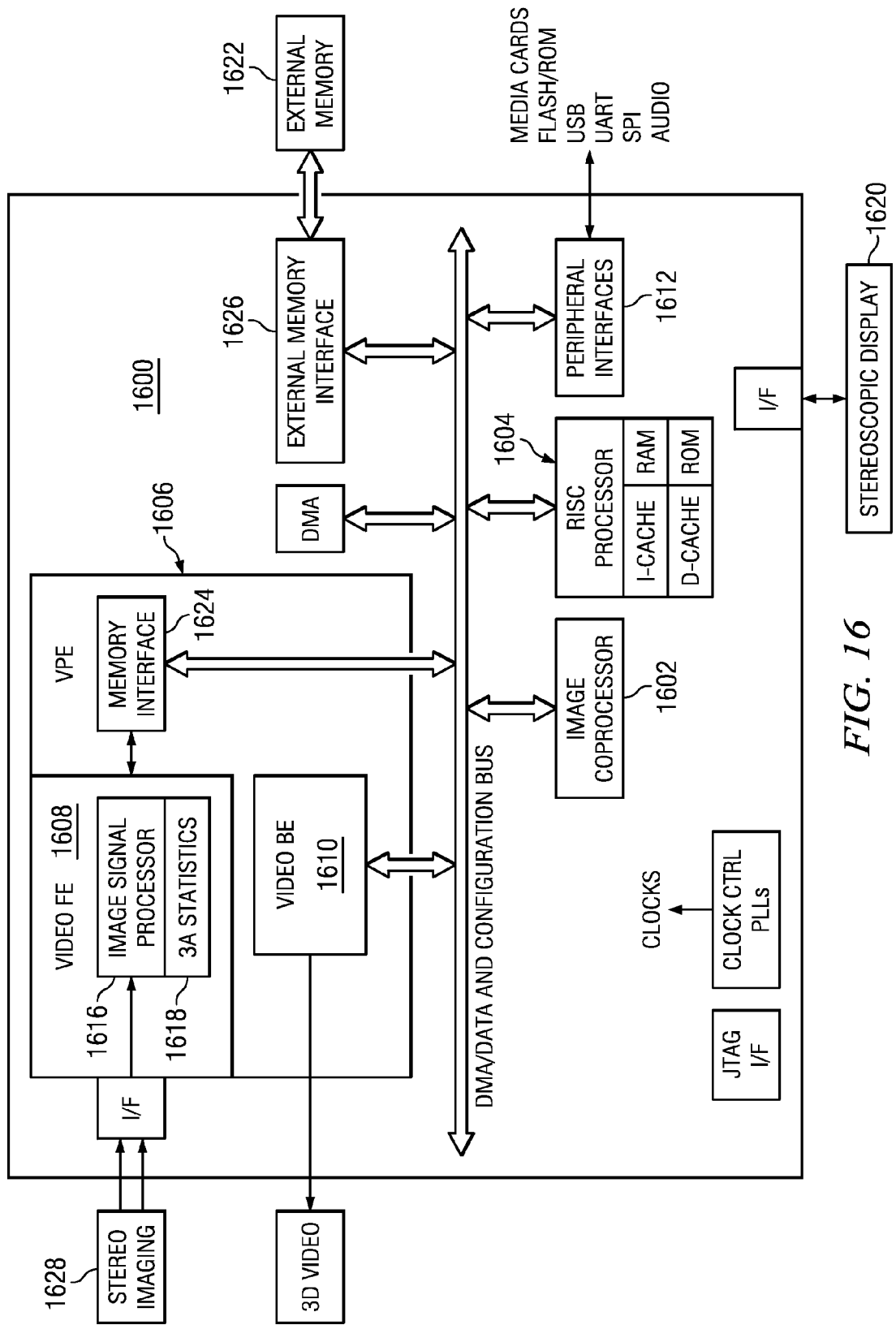
FIG. 16 shows a block diagram of an illustrative digital system.

FIG. 16 shows an illustrative digital system 1600 suitable for use as an embedded system, e.g., in a digital camera or a cellular telephone, in accordance with one or more embodiments. The digital system 1600 includes, among other components, an image coprocessor (ICP) 1602, a RISC processor 1604, and a video processing engine (VPE) 1606 that may be configured to perform automatic focusing of stereoscopic images as described herein. The digital system 1600 also includes an interface for a stereoscopic display 1620, an external memory interface 1626, and peripheral interfaces 1612 for various peripherals that may include a multi-media card, an audio serial port, a Universal Serial Bus (USB) controller, a serial port interface, etc. A stereoscopic display is previously described herein in reference to FIG. 1.

The RISC processor 1604 may be any suitably configured RISC processor. The ICP 1602 may be, for example, a digital signal processor (DSP) or other processor designed to accelerate image processing. The computational operations for automatic focusing of stereoscopic images may be performed by the RISC processor 1604 and/or the ICP 1602. That is, one or both of the processors may perform execute software instructions that perform the functionality of the auto focus module 108 of FIG. 1.

The VPE 1606 includes a configurable video processing front-end (Video FE) 1608 input interface used for stereoscopic image capture from a stereoscopic imaging peripheral 1608, a configurable video processing back-end (Video BE) 1610 output interface used for stereoscopic display devices, and a memory interface 1624 shared by the Video FE 1608 and the Video BE 1610. The stereoscopic imaging peripheral 1608 may be a stereo imaging module as previously described herein in reference to FIG. 1.

The Video FE 1608 includes functionality to perform image enhancement techniques on raw stereoscopic image data from a stereoscopic imaging peripheral 1628 for both previewing of stereoscopic images and recording of stereoscopic images. The image enhancement techniques may include, for example, black clamping, fault pixel correction, color filter array (CFA) interpolation, gamma correction, white balancing, color space conversion, edge enhancement, and detection of average scene brightness for auto exposure adjustment. The Video FE 1608 includes an image signal processor (ISP) 1616, and an H3A statistic generator 3A) 1618. The ISP 1616 is customizable for various imaging sensor types, e.g., CCD or CMOS, and supports video frame rates for preview displays of captured stereoscopic images and for video and still image recording modes. The ISP 1616 also includes, among other functionality, an image resizer, and a boundary signal calculator.

The 3A statistics module 1618 includes functionality to support control loops for auto focus, auto white balance, and auto exposure by collecting metrics on the raw image data, i.e., left and right frames of raw image data for stereoscopic images, from the ISP 1616 or external memory 1622. The 3A statistics module 1618 may be configured to determine paxel focal scores for left and right frames of a stereoscopic image as per a focus search window. That is, the 3A statistics module 1618 may provide functionality similar to that of the focus statistics module 106 of FIG. 1.

The Video BE 1610 includes functionality to manage display data in various formats for several different types of stereoscopic display devices, and to format display data into the output format and output signals required to interface to various stereoscopic display devices.

The memory interface 1624 functions as the primary source and sink to modules in the Video FE 1608 and the Video BE 1610 that are requesting and/or transferring data to/from external memory 1622. The memory interface 1624 includes read and write buffers and arbitration logic.

Other Embodiments

While the invention has been described with respect to a limited number of embodiments, those skilled in the art, having benefit of this disclosure, will appreciate that other embodiments can be devised which do not depart from the scope of the invention as disclosed herein. For example, embodiments have been described herein assuming that two imaging sensor systems are to be automatically focused. One of ordinary skill in the art, having benefit of this disclosure, will understand other embodiments in which more than two lenses are automatically focused without need for additional explanation.

Embodiments of the automatic focus methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope of the invention.

What is claimed is:

1. A method for automatic focus in a stereoscopic imaging device, the method comprising:
  performing a first focus search in a first imaging sensor system of the stereoscopic imaging device;
  determining a first focused lens position for the first imaging sensor system and a second focused lens position for a second imaging sensor system of the stereoscopic imaging device based on the first focus search;
  moving a lens in the first imaging sensor system to the first focused lens position and a lens in the second imaging sensor system to the second focused lens position; and
  performing a second focus search in the second imaging sensor system, and
  wherein determining a first focused lens position comprises:
    selecting a lens position corresponding to a maximum frame focal score from the first focus search as the first focused lens position; and
    selecting a lens position corresponding to a maximum frame focal score from the second focus search as the second focused lens position.

2. The method of claim 1, wherein determining a first focused lens position further comprises:
  performing a second focus search on the second imaging sensor system, wherein the second focus search uses a lens position range centered around the first focused lens position and a focus search window comprising a focus region corresponding to the first focused lens position; and
  selecting a lens position corresponding to a maximum frame focal score from the second focus search as the second focused lens position.

3. The method of claim 1, wherein the first focus search is performed by stepping a lens position in the first imaging sensor system from a macro lens position to a far lens position and computing a frame focal score at each lens position.

4. The method of claim 1, wherein determining a first focused lens position further comprises:
  performing a third focus search on the second imaging sensor system when the maximum frame focal scores of the first focus search and the second focus search correspond to different focus regions, wherein the third focus search uses a lens position range centered around the first focused lens position and a focus search window comprising a focus region corresponding to the maximum frame focal score of the first focus search; and
  selecting a lens position corresponding to a maximum frame focal score from the third focus search as the second focused lens position.

5. The method of claim 1, further comprising:
  performing a second focus search in the second imaging sensor system, and
  wherein determining a first focused lens position further comprises:
    analyzing focal scores from each lens position in the first focus search to determine the first focused lens position; and
    analyzing focal scores for a focus region corresponding to the first focused lens position at each lens position in the second focus search to determine the second focused lens position.

6. The method of claim 1, further comprising:
  performing a second focus search in the second imaging sensor system,
  wherein determining a first focused lens position further comprises:
    computing a combined frame focal score between frame focal scores at lens positions of the first focus search and frame focal scores at lens positions of the second focus search; and
    determining a maximum combined frame focal score, wherein the maximum combined frame focal score combines a frame focal score for a first lens position in the first focus search and a frame focal score for a second lens position in the second focus search; and
    selecting the first lens position as the first focused lens position and the second lens position as the second focused lens position.

7. The method of claim 6, wherein the first lens position and the second lens position are different lens positions.

8. The method of claim 1, wherein
  performing a first focus search further comprises:
    performing the first focus search from a far lens position to a middle lens position; and
    performing a second focus search in the second imaging sensor system from a macro lens position to the middle lens position; and
  determining a first focused lens position further comprises:
    selecting a lens position from the first focus search and the second focus search, wherein the lens position has a maximum frame focal score of frame focal scores from the first focus search and the second focus search;
    performing a third focus search on the first imaging sensor system and a fourth focus search on the second imaging sensor system, wherein the third focus search and the fourth focus search use a lens position range centered around the lens position and a search window centered around a focus region corresponding to the maximum frame focal score;
    selecting a lens position corresponding to a maximum frame focal score from the third focus search as the first focused lens position; and
    selecting a lens position corresponding to a maximum frame focal score from the fourth focus search as the second focused lens position.

9. The method of claim 1, further comprising:
  receiving coordinates of a touch point on a touchscreen, wherein the touch point indicates a user-selected focus location, and
  wherein performing a first focus search further comprises:
    performing the first focus search and performing a second focus search in the second imaging sensor system, wherein the first focus search and the second focus search use a focus search window centered around the user-selected focus location, and
  wherein determining a first focused lens position comprises:
    selecting a lens position corresponding to a maximum frame focal score from the first focus search as the first focused lens position; and
    selecting a lens position corresponding to a maximum frame focal score from the second focus search as the second focused lens position.

10. An stereographic imaging device comprising:
  a first imaging sensor system comprising a lens and an imaging sensor;

a second imaging sensor system comprising a lens and an imaging sensor;

means for performing a first focus search in the first imaging sensor system;

means for determining a first focused lens position for the first imaging sensor system and a second focused lens position for the second imaging sensor system based on the first focus search;

means for moving the lens in the first imaging sensor system to the first focused lens position and the lens in the second imaging sensor system to the second focused lens position; and means for performing a second focus search in the second imaging sensor system, and wherein the means for determining a first focused lens position comprises:

means for selecting a lens position corresponding to a maximum frame focal score from the first focus search as the first focused lens position; and means for selecting a lens position corresponding to a maximum frame focal score from the second focus search as the second focused lens position.

11. The stereographic imaging device of claim 10, wherein the means for determining a first focused lens position further comprises:

means for performing a second focus search on the second imaging sensor system, wherein the second focus search uses a lens position range centered around the first focused lens position and a focus search window comprising a focus region corresponding to the first focused lens position; and means for selecting a lens position corresponding to a maximum frame focal score from the second focus search as the second focused lens position.

12. The stereographic imaging device of claim 10, wherein the first focus search is performed by stepping a lens position in the first imaging sensor system from a far lens position to a near lens position and computing a frame focal score at each lens position.

13. The stereographic imaging device of claim 10, wherein the means for determining a first focused lens position further comprises:

means for performing a third focus search on the second imaging sensor system when the maximum frame focal scores of the first focus search and the second focus search correspond to different focus regions, wherein the third focus search uses a lens position range centered around the first focused lens position and a focus search window comprising a focus region corresponding to the maximum frame focal score of the first focus search; and means for selecting a lens position corresponding to a maximum frame focal score from the third focus search as the second focused lens position.

14. The stereographic imaging device of claim 10, further comprising:

means for performing a second focus search in the second imaging sensor system, and wherein the means for determining a first focused lens position further comprises:

means for analyzing focal scores from each lens position in the first focus search to determine the first focused lens position; and means for analyzing focal scores for a focus region corresponding to the first focused lens position at each lens position in the second focus search to determine the second focused lens position.

15. The stereographic imaging device of claim 10, further comprising:

means for performing a second focus search in the second imaging sensor system, wherein the means for determining a first focused lens position further comprises:

means for computing a combined frame focal score between frame focal scores at lens positions of the first focus search and frame focal scores at lens positions of the second focus search; and means for determining a maximum combined frame focal score, wherein the maximum combined frame focal score combines a frame focal score for a first lens position in the first focus search and a frame focal score for a second lens position in the second focus search; and means for selecting the first lens position as the first focused lens position and the second lens position as the second focused lens position.

16. The stereographic imaging device of claim 15, wherein the first lens position and the second lens position are different lens positions.

17. The stereographic imaging device of claim 10, wherein the means for performing a first focus search further comprises:

means for performing the first focus search from a far lens position to a middle lens position; and means for performing a second focus search in the second imaging sensor system from a macro lens position to the middle lens position; and the means for determining a first focused lens position further comprises:

means for selecting a lens position from the first focus search and the second focus search, wherein the lens position has a maximum frame focal score of frame focal scores from the first focus search and the second focus search;

means for performing a third focus search on the first imaging sensor system and a fourth focus search on the second imaging sensor system, wherein the third focus search and the fourth focus search use a lens position range centered around the lens position and a search window centered around a focus region corresponding to the maximum frame focal score;

means for selecting a lens position corresponding to a maximum frame focal score from the third focus search as the first focused lens position; and means for selecting a lens position corresponding to a maximum frame focal score from the fourth focus search as the second focused lens position.

18. The stereographic imaging device of claim 10, further comprising:

a touchscreen;

means receiving coordinates of a touch point on the touchscreen, wherein the touch point indicates a user-selected focus location, and wherein the means for performing a first focus search further comprises:

means for performing the first focus search and performing a second focus search in the second imaging sensor system, wherein the first focus search and the second focus search use a focus search window centered around the user-selected focus location, and wherein the means for determining a first focused lens position comprises:

means for selecting a lens position corresponding to a maximum frame focal score from the first focus search as the first focused lens position; and means for selecting a lens position corresponding to a maximum frame focal score from the second focus search as the second focused lens position.

* * * * *